United States Patent Office 3,637,765
Patented Jan. 25, 1972

3,637,765
METHOD FOR THE PREPARATION OF (CIS-1,2-EPOXYPROPYL)-PHOSPHONIC ACID AND DERIVATIVES
Raymond A. Firestone, Fanwood, N.J., assignor to Merck & Co., Inc., Rahway, N.J.
No Drawing. Continuation-in-part of application Ser. No. 796,173, Feb. 3, 1969. This application Jan. 16, 1970, Ser. No. 3,515
Int. Cl. C07f 9/38, 9/40, 9/42, 9/44
U.S. Cl. 260—348 R                    12 Claims

ABSTRACT OF THE DISCLOSURE

A method for the preparation of (cis-1,2-epoxypropyl) phosphonic acid and the salt, ester and amide derivatives thereof, which comprises treating a 1-propenylphosphonate, 1-propenylphosphonic dihalide or 1-propenylphosphonic diamide which is substituted by a leaving group, with a base. Suitable leaving groups include, for example, the sulfonium, sulfoxonium, ammonium or phosphonium cation. The (cis-1,2-epoxypropyl)phosphonic acid product thus obtained and its salts are antibiotics which have utility as antibacterials in inhibiting the growth of gram-negative and gram-positive pathogenic bacteria.

---

This application is a continuation-in-part of U.S. application Ser. No. 796,173 filed Feb. 3, 1969.

This invention relates to a novel method for the preparation of (cis-1,2-epoxypropyl)phosphonic acid and the salt, ester and amide derivatives thereof via the reaction of a 1-propenylphosphonate or 1-propenylphosphonic dihalide or 1-propenylphosphonic diamide which is substituted by a leaving group, with a base.

The (±) and (−) (cis-1,2-epoxypropyl)phosphonic acid product of this invention and the salts thereof are antimicrobial agents, which are useful in inhibiting the growth of gram-positive and gram-negative pathogenic bacteria. The (−) form, and particularly its salts such as the sodium and calcium salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis Proteus morganii, Staphylococcus aureus* and *Staphylococcus pyrogenes*. Thus, (±) and (−) (cis-1,2-epoxypropyl)phosphonic acid and the salts thereof can be used as antiseptic agents to remove susceptible organisms from pharmaceutical, dental and medical equipment and can also be used in other areas subject to infection by such organisms. Similarly, they can be used to separate certain microorganisms from mixtures of microorganisms. The salts of (−) (cis-1,2-epoxypropyl)phosphonic acid are particularly valuable because not only do they have application in the treatment of diseases caused by bacterial infections in man and animals, but they are active against resistant strains of pathogens. The said salts constitute a preferred embodiment of this invention because they are effective when given orally, although it is to be noted that they can also be administered parenterally.

The esters and amides of (cis-1,2-epoxypropyl)phosphonic acid have utility as intermediates inasmuch as they may be converted by hydrolysis, hydrogenolysis or other known means to the pharmacologically active (cis-1,2-epoxypropyl)phosphonic acid and its salts.

In accordance with this invention (cis-1,2-epoxypropyl)phosphonic acid and its salts and ester derivatives (I, infra) are obtained by treating a 1-propenylphosphonate or 1-propenylphosphonic dihalide or 1-propenylphosphonic diamide which is substituted at either the 1- or 2-carbon of the propenyl moiety by a leaving group, with a base. Suitable leaving groups include, for example, sulfonium, sulfoxonium, phosphonium and ammonium cations. Temperature is not critical to the reaction and, in general, the process is most advantageously conducted by simply adding the base to the 1-propenylphosphonate or 1-propenylphosphonic dihalide or 1-propenylphosphonic diamide reactant (II) at a temperature in the range from about −10° C. up to the boiling point of the solvent employed. The choice of a suitable solvent depends to a large extent upon the starting material. For example, when the starting material is a 1-propenylphosphonic dihalide corresponding to Formula II, infra, wherein $R^3$ and $R^4$ represent halo, then water is the preferred medium, whereas, when the starting material is a 1-propenylphosphonate or 1-propenylphosphonic diamide corresponding to Formula II, infra, wherein $R^3$ and $R^4$ are hydrocarbyloxy or an amido moiety, then the solvents of choice are either solvents such as tetrahydrofuran, 1,2-dimethoxyethane, bis-(2-methoxyethyl)ether or diethyl ether and the like. The following equation illustrates the process of this invention:

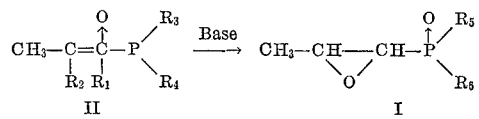

wherein $R^1$ and $R^2$ represent hydrogen and an onium radical of the formula $-R^{\oplus}X^{\ominus}$ wherein $R^{\oplus}$ is a cation selected from di-lower alkyl sulfonium such as dimethylsulfonium, diethylsulfonium and the like, di-lower alkylsulfoxonium such as dimethylsulfoxonium, diethylsulfoxonium and the like, tri-lower alkylammonium such as trimethylammonium, triethylammonium and the like or triarylphosphonium as, for example, a mononuclear triarylphosphonium cation such as triphenylphosphonium and the like and $X^{\ominus}$ is an anion as, for example, a halo anion such as a chloro, bromo or iodo anion, with the proviso that $R^1$ and $R^2$ cannot both represent hydrogen at the same time, and $R^3$ and $R^4$ represent alkoxy, for example, lower alkoxy such as methoxy, ethoxy, n-propoxy, isopropoxy, n-butoxy, n-amyloxy and the like, lower alkenyloxy such as allyloxy and the like, lower alkynyloxy such as propynyloxy and the like, aryloxy, for example, mononuclear aryloxy such as phenoxy and the like and aralkoxy, for example, mononuclear aralkoxy such as benzyloxy and the like, halo such as bromo, chloro, iodo and the like or di-lower alkylamino such as dimethylamino, diethylamino and the like and $R^5$ and $R^6$ have the same definition as $R^3$ and $R^4$ with the proviso that when $R^3$ and $R^4$ represent halo then either or both of $R^5$ and $R^6$ represent the moiety —OH or —OM wherein M is the cation derived from the base employed in the reaction. Suitable bases which may be employed to effect epoxide formation include any base having a pH greater than 7 as, for example, alkali metal or alkaline earth metal hydroxides such as sodium hydroxide, potassium hydroxide, calcium hydroxide, magnesium hydroxide and the like and aqueous solutions of the following reagents: alkali metal or alkaline earth metal carbonates or bicarbonates such as sodium carbonate, potassium carbonate, calcium carbonate, sodium bicarbonate, potassium bicarbonate and the like, basic metal oxides such as sodium oxide, potassium oxide, calcium oxide, cadmium oxide, silver oxide and the like, ammonia, tertiary organic bases, for example, tertiary lower alkylamines such as trimethylamine, triethylamine, pyridine and the like, quaternary ammonium bases, for example, benzyltrimethylammonium hydroxide, tri-lower alkylammonium alkoxides such as trimethylammonium methoxide, triethylammonium ethoxide and the like, alkali metal or alkaline earth metal alkoxides such as sodium methoxide, sodium ethoxide, potassium ethoxide, potassium tert.-butoxide and the like.

The 1-propenylphosphonic dihalides and corresponding esters and amides (II) which are employed as starting materials in this process are synthesized by either of two routes. When, for example, the leaving group, i.e., the onium cation corresponding to $R^1$ and $R^2$ in planar Formula II, supra, is bonded to the beta or 2-carbon of the propenyl moiety the said starting materials are conveniently obtained by treating a (2-halo-1-methylvinyl)onium halide (III, infra) with a compound of the formula:

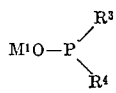

wherein $M^1$ is an alkali metal cation such as a sodium or potassum cation and $R^3$ and $R^4$ are as defined above. This process is most conveniently conducted by admixing the reactants while maintaining the reaction temperature in the range of from about $-10°$ C. to $25°$ C. followed by a gradual warming of the reaction mixture up to a temperature of about $100°$ C. over a period of from one to two hours, depending upon the reactivity of the reactants. The following equation illustrates this method of preparation:

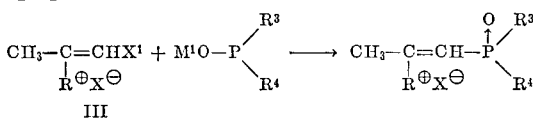

wherein $X^1$ represents halo such as bromo, chloro, iodo and the like and $R^3$, $R^4$, $R^\oplus$, $X^\ominus$ and $M^1$ are as defined above.

The (2-halo-1-methylvinyl)onium halides (III) employed as starting materials in the foregoing equation are obtained by treating a (2-dihalo-1-methylethyl)onium halide (IV, infra) with a strong base as, for example, with an alkali metal alkoxide such as potassium tertiary butoxide, sodium methoxide and the like or with an organo metallic compound as, for example, with an organo lithium such as phenyl lithium and the like. Temperature is not critical and, in general, the reaction is most conveniently conducted at ambient temperature or at temperatures slightly above ambient temperature. Any solvent which is substantially inert and in which the reagents are reasonably soluble may be employed; suitable solvents include, for example, dimethylsulfoxide, dimethylformamide, diethyl ether and the like. The following equation illustrates this method of preparation:

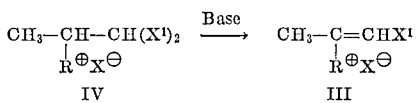

wherein $R^\oplus$, $X^\ominus$ and $X^1$ are as defined above.

The (2-dihalo-1-methylethyl)onium halides (IV) which are employed as intermediates in the preparation of the (2-halo-1-methylvinyl)onium halides (III, supra) are obtained by treating a 1,1-dihalo-2-halopropane (V, infra) with a nucleophilic agent selected from di-lower alkylsulfide such as dimethylsulfide, diethylsulfide and the like, di-lower alkylsulfoxide such as dimethylsulfoxide, diethylsulfoxide and the like, a tri-lower alkylamine such as trimethylamine, triethylamine and the like or a triarylphosphine such as triphenylphosphine and the like. The following equation illustrates this method of preparation:

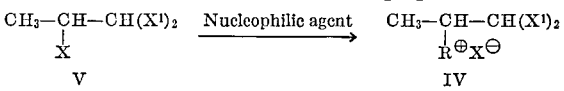

wherein $R^\oplus$, $X^\ominus$, $X^1$ and the nucleophilic agent are as defined above and X is halo as, for example, bromo, chloro, or iodo and the like. The temperature at which the reaction is conducted depends largely upon the reactivity of the nucleophilic reagent employed and varies from about $80°$ C. for the more volatile reagents, that is, the di-lower alkylsulfides, tri-lower alkylamines and triphenylphosphines, up to the boiling point of the less reactive di-lower alkylsulfoxides. When the reagent employed is a di-lower alkylsulfide or tri-lower alkylamine, the reaction is conveniently conducted in the absence of a solvent in a sealed container whereas, when the reagent is triphenylphosphine, any solvent which is inert to the reactants may be employed such as benzene and the like. And when a di-lower alkylsulfoxide is the reagent employed it is most desirable to use an excess of the di-lower alkylsulfoxide as the solvent.

Those 1 - propenylphosphonic dihalide, ester and amide reactants (II) wherein the leaving group is bonded to the alpha or 1-carbon are obtained via the reaction of a (phosphinyl)onium methylide (VI, infra) with an ethylidene dihalide to afford a [1-(phosphinyl)-2-halopropyl]-onium halide intermediate (VII, infra) which is then subjected to dehydrohalogenation. The 1-propenylphosphonic dihalide, ester or amide (II) thus obtained is in substantially pure form and may be used directly as the starting material in the process of this invention. Generally, the [1 - (phosphinyl) - 2-halopropyl]onium halide intermediate (VII) is subjected to dehydrohalogenation via treatment with a suitable base such as potassium tertiary butoxide or potassium hydroxide in a suitable solvent such as dimethylsulfoxide; however, in some instances as, for example, in preparing the 1-propenylphosphonic dihalide reactant it has been found that the corresponding [1-(dihalophosphinyl) - 2 - halopropyl]onium halide intermediate is a relatively unstable compound which undergoes spontaneous dehydrohalogenation in the absence of base. The following equation illustrates this two-step synthesis of the 1-propylphosphonic dihalide and corresponding ester and amide reactants (IIa, infra):

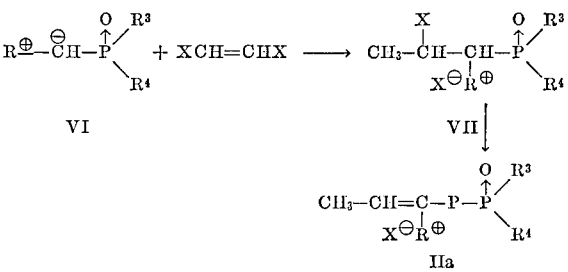

wherein X is halo such as chloro, bromo, iodo and the like and $R^\oplus$, $R^3$, $R^4$ and $X^\ominus$ are as defined above.

The (phosphinyl)onium methylides (VI) which are employed as starting materials in the foregoing synthesis are novel compounds which may be obtained by several routes. Thus, the (phosphinyl)onium methylides wherein $R^3$ and $R^4$ represent a hydrocarbyloxy moiety such as alkoxy, lower alkenyloxy, lower alkynyloxy, aryloxy or aralkoxy or a di-lower alkylamino moiety, are obtained by treating an halomethylphosphonic dihalide (VIII, infra) with either the appropriate alcohol or dialkylamine to afford the corresponding halomethylphosphonate or halomethylphosphonic diamide which, upon treatment with the appropriate di-lower alkylsulfide, di-lower alkylsulfoxide, tri-lower alkylamine or triarylphosphine and a base, such as sodium methylsulfonylmethylide, affords the desired compound. The following equation wherein the halomethylphosphonic dihalide (VIII) is treated with an alkanol illustrates this method of preparation, however, it is to be understood that any suitable lower alkenol, lower alkynol, phenol, aralkanol or di-lower alkylamine can be substituted therefor in an otherwise analogous process to yield the desired halomethylphosphonate or halomethylphosphonic diamide:

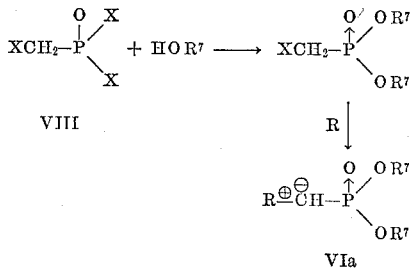

wherein HOR⁷ represents a lower alkanol such as methanol, ethanol, n-propanol and the like, —OR⁷ represents a lower alkoxy radical such as methoxy, ethoxy, n-propoxy and the like and R⊕ and X are as defined above.

Alternatively, the (dihalophosphinyl)onium methylide corresponding to Formula VI, supra, wherein R³ and R⁴ represent halo are conveniently obtained via the treatment of a dihalomethoxyphosphine with a solution of methylene halide in a di-lower alkylsulfide or di-lower alkylsulfoxide and the like until the evolution of methylene halide ceases and the resulting mixture is then treated with an equivalent amount of base, such as sodium hydride, to afford the desired methylide. The following equation wherein the dihalomethoxyphosphine is treated with a solution of methylene halide in dimethylsulfoxide illustrates this method of preparation; however, it is to be understood that other reactants such as a mixture of methylene halide in dimethylsulfide and the like may be substituted therefor in an otherwise similar reaction to afford the corresponding (dihalophosphinyl)di-lower alkylsulfonium methylide:

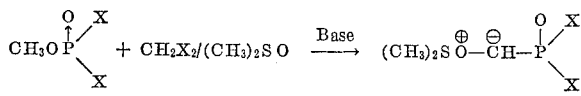

wherein CH₂X₂ represents a methylene halide such as methylene iodide, methylene chloride, methylene bromide and the like and X is as defined above.

The 1-propenylphosphonate, 1-propenylphosphonic dihalide and 1-propenylphosphonic diamide reactants described herein can also be named as "onium halide" derivatives as, for example, {2-[di-substituted oxy(or tetra-substituted amino or dihalo)phosphinyl]-1-methylvinyl} onium halides. In the preceding disclosure the former terminology has been used in preference to the "onium halide" nomenclature; however, in naming the reactants in Examples 1–11 the "onium halide" terminology is employed because it is preferred by "Chemical Abstracts" and, also, because it is consistent with the terminology which is used to define the "onium halide" precursors.

The products obtained via the instant process may, if desired, be converted to (cis - 1,2 - epoxypropyl)-phosphonic acid or its salts by any suitable means; these include, for example, hydrolytic means such as comprises treating the said esters with an aqueous solution of an acid such as hydrochloric acid or sulfuric acid under carefully buffered conditions or with an aqueous solution of a base such as an alkali metal or alkaline earth metal carbonate, bicarbonate, oxide or hydroxide or, alternatively, by treatment with trimethylchlorosilane followed by aqueous hydrolysis; or by hydrogenolysis; or via the application of suitable reductive, displacement or oxidative means; or by treatment of the said esters or amides with a photochemical agent. The choice of a suitable method for the conversion of the said esters and amides to (cis - 1,2 - epoxypropyl)phosphonic acid or its salts depends to a large extent upon the character of the ester or amide moiety comprising the phosphonate, phosphonamidate or diamide portion of the molecule. For example, when the ester is a monomethyl or dimethyl ester, the conversion to (cis - 1,2 - epoxypropyl)phosphonic acid is most advantageously conducted by treating the said ester with trimethylchlorosilane followed by the aqueous hydrolysis of the silane ester intermediate thus obtained to the free acid. The alkylsilane ester interchange is accomplished by refluxing the silane compound, such as chlorotrimethylsilane, with the alkyl ester in an inorganic solvent such as hexane, benzene and the like. In addition to the foregoing, the alkyl esters of (cis-1,2-epoxypropyl)phosphonic acid and the aryl analogs thereof, including esters of mixed function such as (cis - 1,2-epoxypropyl)phosphonate wherein one ester moiety is derived from phenol and the like, may be converted to the free acid by alkaline hydrolysis. However, in view of the high degree of stability of the dialkyl esters it is not common to find that the treatment of a dialkyl (cis-1,2-epoxypropyl)phosphonate with an aqueous solution of a base usually affords the monoalkyl ester intermediate and, therefore, the ultimate conversion of the alkyl diester to the salt or free acid necessitates a second step, such as treatment with a photochemical agent or an acidic reagent in order to effect the removal of the remaining alkyl ester moiety.

Hydrogenolysis is particularly effective in converting alkenyl esters of (cis - 1,2 - epoxypropyl)phosphonates to the corresponding acids and, preferably, the hydrogenation is conducted in the presence of a Raney nickel catalyst and a base such as triethylamine, pyridine or dimethylaniline and the like, within a temperature range of from about room temperature up to about 200° C. Suitably inert organic solvents which may be employed in the hydrogenation process include, for example, methanol, ethanol, ethyl acetate, acetic acid, dimethyl ether, diethyl ether, tetrahydrofuran, hexane, xylene or benzene and the like.

Acidic hydrolyzing agents are also useful in the conversion of the amides of (cis-1,2-epoxypropyl)phosphonic acid to the corresponding salts of (cis-1,2-epoxypropyl)-phosphonic acid via treatment with a strongly acidic ion exchange resin. According to this method of preparation, a solution of the monoamide or diamide is percolated through a column of the ion exchange resin or, an aqueous solution of the amide is stirred with the resin which, upon completion of the reaction, is filtered off and then a molecular equivalent of a suitable base is added to afford the phosphonic acid salt.

The nuclear carbons comprising the epoxide ring in the instant products are asymmetric in character and, therefore, the said products may be obtained in the form of one or more of four optically active isomers. In this connection it should be noted that (—) (cis-1,2-epoxypropyl)phosphonic acid and its salts are particularly effective in inhibiting the growth of pathogenic bacteria and, therefore, the preparation of that isomer constitutes a preferred embodiment of this invention.

The (—) (cis-1,2-epoxypropyl)phosphonic acid referred to herein rotates plane-polarized light in a counterclockwise direction (to the left as viewed by the observer) when the rotation of its disodium salt is measured in water (5% concentration) at 405 m$\mu$.

The designation cis used in describing the 1,2-epoxypropylphosphonic compounds means that each of the hydrogen atoms attached to carbon atoms 1 and 2 of the propylphosphonic acid are on the same side of the oxide ring.

The following examples illustrate the method by which (cis-1,2-epoxypropyl)phosphonic acid and its salts, ester and amide derivatives (I) may be obtained. However, the examples are illustrative only and should not be construed as being limited thereto since other functionally equivalent reagents may be substituted therefor to yield an identical (cis-1,2-epoxypropyl)phosphonic acid and its salt and ester derivatives.

The instant process is intended to include other functionally equivalent methods of preparation. Therefore, any modification of this synthesis which results in the formation of an identical product should be construed as constituting an analogous method. The claimed process is capable of wide variation and modification and, therefore, any minor departure therefrom or extension thereof is considered as being within the skill of the artisan and as falling within the scope of this invention.

EXAMPLE 1

(Cis-1,2-epoxypropyl)phosphonic acid and disodium salt

Step A: (2,2 - dichloro-1-methylethyl)dimethylsulfonium bromide.—1,1-dichloro-2-bromopropane (10 g., 0.0524 mole) and dimethylsulfide (25 g., 0.42 mole) are mixed and heated overnight at 80° C. at autogenic pressure in a sealed bomb. The bomb is cooled and opened and the excess dimethylsulfide evaporated to yield a thick mass which becomes crystalline upon trituration with ether. The crude product which separates is collected by filtration, washed with ether and recrystallized from a mixture of methanol and water to yield (2,2-dichloro-1-methylethyl)dimethyl sulfonium bromide.

Step B: (2 - chloro-1-methylvinyl)dimethylsulfonium bromide.—(2,2-dichloro - 1 - methylethyl)dimethylsulfonium bromide (10.0 g., 0.0394 mole (in dimethylsulfoxide (25 ml.) is added to a suspension of potassium tertiary butoxide (4.16 g., 0.037 mole) in dimethylsulfoxide (25 ml.) The reaction mixture is stirred for one hour at room temperature. The solvent is removed under vacuum and the crude (2-chloro-1-methylvinyl dimethylsulfonium bromide is extracted with ethanol. The ethanol is removed under vacuum and the crude product which remains is recrystallized from a mixture of ethanol and ether to yield (2-chloro-1-methylvinyl)dimethyl sulfonium bromide.

Step C: [2 - dimethoxyphosphinyl)-1-methylvinyl]dimethylsulfonium bromide.—(2-chloro-1-methylvinyl)dimethylsulfonium bromide (7.85 g., 0.036 mole) is treated with trimethylphosphite (4.46 g., 0.036 mole) at —10° C. The reaction mixture is heated slowly to 50° C. over a two-hour period to yield [2-(dimethoxyphosphinyl)-1-methylvinyl]dimethylsulfonium bromide.

Step D: Dimethyl (cis - 1,2 - epoxypropyl)phosphonate.—To a solution of [2-(dimethoxyphosphinyl)-1-methylvinyl]dimethylsulfonium bromide (10.0 g., 0.0344 mole) in tetrahydrofuran (100 ml.) is added powdered anhydrous potassium hydroxide (1.96 g., 0.035 mole). The reaction mixture is stirred for several hours at ambient temperature. The potassium chloride and unreacted hydroxide is removed by filtration and the filtrate is evaporated under vaccum to yield dimethyl (cis-1,2-epoxypropyl)phosphonate which is purified by vacuum distillation, B.P 70–71° C./0.5 mm.

Step E: (Cis-1,2-epoxypropyl)phosphonic acid and disodium salt.—Dimethyl (cis-1,2-epoxypropyl)phosphonate (1 mm.) in trimethylchlorosilane (10 ml.) is refluxed for eight hours and the reaction mixture is then extracted with water to yield an aqueous solution of (cis-1,2-epoxypropyl)-phosphonic acid. The product thus obtained is then treated with two equivalents of sodium hydroxide and the solution evaporated to yield disodium (cis-1,2-epoxypropyl)phosphonate.

EXAMPLE 2

(Cis-1,2-epoxypropyl)phosphonic acid monosodium salt

Step A: [2 - (dichlorophosphinyl)-1-methylvinyl]-dimethylsulfonium bromide.—(2-chloro-1-methylvinyl)dimethylsulfonium bromide (10 g., 0.046 mole), prepared as above in Example 1, Step B, is treated with dichloromethoxyphosphine (6.8 g., 0.046 mole) at ambient temperature. The reaction mixture is slowly heated to 100° C. and maintained there for one hour. The reaction mixture is then cooled and the unreacted dichloromethoxyphosphine formed during the course of the reaction is removed under vacuum to yield [2-(dichlorophosphinyl)-1-methylvinyl]dimethylsulfonium bromide.

Step B: (Cis-1,2-epoxypropyl)phosphonic acid monosodium salt.—To an aqueous solution of sodium hydroxide (0.195 mole; 78 ml. of 2.5 N) at 0° C. is added [2 - (dichlorophosphinyl) - 1-methylvinyl]dimethylsulfonium bromide (0.0394 mole). After stirring at 0° C. for 30 minutes, the reaction mixture is brought to a pH of 6. Removal of the solvent under vacuum yields (cis-1,2-epoxypropyl)phosphonic acid monosodium salt.

By substituting for the (2 - chloro-1-methylvinyl)-dimethylsulfonium bromide of Step A, Example 2, an equimolar quantity of (2-chloro-1-methylvinyl)dimethylsulfoxonium bromide, (2-chloro-1-methylvinyl)trimethylammonium bromide or (2-chloro-1-methylvinyl)triphenylphosphonium bromide and by following substantially the procedure described therein, there is obtained respectively [2 - (dichlorophosphinyl) - 1 - methylvinyl]dimethylsulfoxonium chloride, [2 - (dichlorophosphinyl)-1-methylvinyl]trimethylammonium chloride, and [2 - (dichlorophosphinyl) - 1-methylvinyl]triphenylphosphonium chloride which when substituted for the [2 - (dichlorophosphinyl) - 1 - methylvinyl]dimethylsulfonium bromide of Step B, Example 2, is converted to (cis-1,2-epoxypropyl)-phosphonic acid monosodium salt by following substantially the procedure described therein.

EXAMPLE 3

(Cis-1,2-epoxypropyl)phosphonic acid

Step A: (2,2 - dichloro-1-methylethyl)triphenylphosphonium bromide.—To a solution of triphenylphosphine (26.2 g., 0.10 mole) in benzene (25 ml.) is added 1,1-dichloro-2-bromo-propane (21.1 g., 0.11 mole). The reaction mixture is refluxed under nitrogen atmosphere overnight. The reaction mixture is cooled to room temperature whereupon (2,2-dichloro-1-methylethyl)triphenylphosphonium bromide precipitates and is collected by filtration.

Step B: (2 - chloro-1-methylvinyl)triphenylphosphonium bromide.—To a solution of phenyl lithium (8.4 g., 0.1 mole) in ether (100 ml.) is added, slowly, (2,2-dichloro - 1 - methylethyl)triphenylphosphonium bromide (45.4 g., 0.1 mole) under a nitrogen atmosphere with stirring. The reaction mixture is refluxed for 30 minutes and then cooled and the crude product collected by filtration. The crude product, which is contaminated with lithium chloride, is washed with ether and taken up in a small volume of ethanol. The insoluble lithium chloride is filtered off and the filtrate is diluted with ether to precipitate (2-chloro-1-methylvinyl)triphenylphosphonium bromide.

Step C: [2 - (dibenzyloxyphosphinyl)-1-methylvinyl]-triphenylphosphonium bromide.—(2 - chloro-1-methylvinyl)triphenylphosphonium bromide (33.4 g., 0.08 mole) is treated with tribenzyl phosphite (28.2 g., 0.08 mole) at —10° C. The reaction mixture is brought slowly to 50° C. over a two-hour period. The benzyl bromide formed during the course of the reaction is removed under vacuum to yield [2-(dibenzyloxyphosphinyl)-1-methylvinyl]triphenylphosphonium bromide.

Step D: Dibenzyl (cis-1,2-epoxypropyl)phosphonate.—To a solution of [2 - (dibenzyloxyphosphinyl)-1-methylvinyl]triphenylphosphonium bromide (45.0 g., 0.07 mole) in tetrahydrofuran (100 ml.) is added powdered anhydrous potassium hydroxide (3.93 g., 0.07 mole). The reaction mixture is stirred for several hours at ambient temperature and then filtered to remove the potassium chloride and unreacted potassium hydroxide. Evaporation of the filtrate, under vacuum, yields the crude product which is vacuum distilled to yield dibenzyl (cis - 1,2-epoxypropyl)phosphonate.

Step E: (Cis - 1,2-epoxypropyl)phosphonic acid.—A solution of dibenzyl (cis - 1,2-epoxypropyl)phosphonate (0.1 mole) in ethanol (100 ml.) is hydrogenated over a 5% palladium on charcoal catalyst (1.0 g.) at atmospheric pressure at 25° C. When the mixture has taken up 0.2 mole of hydrogen, the mixture is filtered and the filtrate concentrated to dryness under vacuum to yield (cis-1,2-epoxypropyl)phosphonic acid.

EXAMPLE 4

(Cis-1,2-epoxypropyl)phosphonic acid

Step A: (2,2 - dichloro - 1-methylethyl)dimethylsulfoxonium bromide.—1,1-dichloro-2-bromopropane (19.2 g., 0.1 mole) and dimethylsulfoxide (100 ml.) are refluxed together for one week. The unreacted starting materials are removed under vacuum with slight warming up to 50° C. The crude product is recrystallized from a mixture of methanol and ether to yield (2,2-dichloro-1-methylethyl)dimethylsulfoxonium bromide.

Step B: (2-chloro-1-methylvinyl)dimethylsulfoxonium bromide.—To a suspension of (2,2-dichloro-1-methylethyl)dimethylsulfoxonium bromide (27.0 g., 0.1 mole) in dimethylsulfoxide (50 ml.) is added a suspension of potassium tertiary butoxide (10.7 g., 0.095 mole) in dimethylsulfoxide (50 ml.). The reaction mixture is stirred for one hour at room temperature and the solvent then removed under vacuum. The crude product is dissolved in ethanol and the potassium chloride removed by filtration. The ethanol is removed under vacuum to yield the crude product which may be recrystallized from a mixture of ethanol and ether to yield (2-chloro-1-methylvinyl)dimethylsulfoxonium bromide.

Step C: [2-(di-phenylphosphinyl) - 1 - methylvinyl]dimethylsulfoxonium bromide.—(2 - chloro-1-methylvinyl) dimethylsulfoxonium bromide (10 g., 0.043 mole) and triphenyl phosphite (13.4 g., 0.043 mole) are mixed at −10° C. and slowly heated to 50° C. over a two-hour period. The mixture is cooled and ether (50 ml.) is added to precipitate the product which is washed with ether (50 ml.) and dried to yield [2-(di-phenylphosphinyl)-1-methylvinyl]dimethylsulfoxonium bromide.

Step D: Di-phenyl (cis-1,2-epoxypropyl)phosphonate.—To a solution of [2-(di-phenylphosphinyl)-1-methylvinyl]dimethylsulfoxonium bromide (15.27 g., 0.04 mole) in tetrahydrofuran (100 ml.) is added powdered anhydrous potassium hydroxide (2.24 g., 0.04 mole). The reaction mixture is stirred for two hours at room temperature and then filtered to remove potassium chloride and unreacted potassium hydroxide. The solvent is removed from the filtrate, under vacuum, to yield di-phenyl (cis-1,2-epoxypropyl)phosphonate which is converted to sodium salt by basic hydrolysis.

EXAMPLE 5

(Cis-1,2-epoxypropyl)phosphonic acid

Step A: (2,2-dichloro - 1 - methylethyl)trimethylammonium bromide.—1,1-dichloro - 2 - bromopropane (10 g., 0.0524 mole) and trimethylamine (25 g., 0.42 mole) are placed in a bomb tube and heated to 100° C. for 8 hours. The tube is cooled and opened and the excess trimethylamine allowed to evaporate. The 1,1-dichloro-2-bromopropane is removed under vacuum to yield (2,2-dichloro-1-methylethyl)trimethylammonium bromide.

Step B: (2-chloro-1-methylvinyl)trimethylammonium bromide.—(2,2 - dichloro-1-methylethyl)trimethylammonium bromide (9.9 g., 0.0394 mole) in dimethylsulfoxide (25 ml.) is added to a suspension of potassium tertiary butoxide (4.16 g., 0.037 mole) in dimethylsulfoxide (25 ml.). The reaction mixture is stirred for one hour at room temperature. The solvent is removed under vacuum and the (2-chloro-1-methylvinyl)trimethylammonium bromide is extracted with ethanol. The ethanol is removed under vacuum and the product which remains is recrystallized from a mixture of ethanol and ether to yield (2-chloro-1-methylvinyl)trimethylammonium bromide.

Step C: [2-(diallylphosphinyl)-1-methylvinyl]trimethylammonium bromide.—(2-chloro - 1 - methylvinyl)trimethylammonium bromide (7.7 g., 0.036 mole) is treated with tri-allyl phosphite (6.1 g., 0.036 mole) at −10° C. The reaction mixture is slowly heated to 50° C. and held there for a two-hour period to afford [2-(di-allylphosphinyl)-1-methylvinyl]trimethylammonium bromide.

Step D: Diallyl (cis-1,2-epoxypropyl)phosphonate.—To a solution of [2-(di-allylphosphinyl)-1-methylvinyl]-trimethylammonium bromide (0.0344 mole) in tetrahydrofuran (100 ml.) is added powdered anhydrous potassium hydroxide (1.96 g., 0.035 mole). The reaction mixture is stirred for several hours at ambient temperature. The potassium chloride and unreacted potassium hydroxide is removed by filtration and the filtrate concentrated under vacuum to yield diallyl (cis-1,2-epoxypropyl) phosphonate.

Step E: (Cis-1,2-epoxypropyl)phosphonic acid.—A solution of diallyl (cis-1,2-epoxypropyl)phosphonate (1.91 g., 0.1 mole) in ethanol (20 ml.) is shaken with hydrogen under 40 p.s.i. of pressure at room temperature until the calculated hydrogen uptake for the removal of the two allyl groups is essentially accomplished. The reaction mixture is filtered free of catalyst and the filtrate concentrated under vacuum to yield (cis-1,2-epoxypropyl) phosphonic acid.

EXAMPLE 6

(Cis-1,2-epoxypropyl)phosphonic acid monopotassium salt

To a solution of potassium hydroxide (10.9 g., 0.195 mole) in water (50 ml.) is added [2-(dichlorophosphinyl)-1-methylvinyl]dimethylsulfonium chloride (10.0 g., 0.0394 mole) at 0° C. The reaction mixture is stirred for 30 minutes at 0° C. and the pH is then adjusted to 6. Removal of the solvent yields (cis-1,2-epoxypropyl)phosphonic acid mono-potassium salt.

EXAMPLE 7

(Cis-1,2-epoxypropyl)phosphonic acid and disodium salt

Step A: Diethyl chloromethylphosphonate.—Chloromethylphosphonic dichloride (167.37 g., 1.0 mole) is added dropwise to ethanol (92.0 g., 2.0 moles) at 30° C. and 20 mm. pressure over a one-hour period. After stirring for an additional two hours, the reaction mixture is brought slowly to 50° C. over a two-hour period and the ethanol is removed by decreasing the pressure to 4 mm. The residue is then washed with a solution of aqueous sodium bicarbonate and fractionally distilled to yield diethyl chloromethylphosphonate.

Step B: (Diethoxyphosphinyl)dimethylsulfonium methylide.—Dimethyl sulfide (20 ml.) is added to diethyl chloromethylphosphonate (10.0 g.) and the mixture is stirred for 24 hours at 25° C. Excess dimethylsulfide is then removed by evaporation whereupon a residue identified as (diethoxyphosphinylmethyl)dimethylsulfonium chloride is obtained and the said intermediate is added to a solution containing one equivalent of sodium methylsulfonylmethylide in dimethyl sulfoxide (250 ml.) to yield (diethoxyphosphinyl)dimethylsulfonium methylide.

Step C: [1 - (diethoxyphosphinyl)-2-bromopropyl]-dimethylsulfonium bromide.—To the solution of (diethoxyphosphinyl)dimethylsulfonium methylide obtained in Step B is added one equivalent (8.7 g.) of ethylidene dibromide at room temperature. The mixture is stirred 7 hours and then heated briefly at 50° C. to afford a solution of [1-diethoxyphosphinyl)-2-bromopropyl]dimethylsulfonium bromide.

Step D: [1 - (diethoxyphosphinyl)-2-methylvinyl]-dimethylsulfonium bromide.—To the solution of [1-(diethoxyphosphinyl) - 2 - bromopropyl]dimethylsulfonium bromide obtained in Step C is added a suspension of one equivalent of potassium tertiary butoxide (5.2 g.) in 25 ml. of dimethylsulfoxide. The mixture is stirred for an hour at room temperature. The solvent is then removed in vacuo and the crude residue digested in ethanol. The ethanol extract is precipitated with ether to yield [1-(diethoxyphosphinyl) - 2 - methylvinyl]-dimethylsulfonium bromide.

Step E: Diethyl (cis-1,2-epoxypropyl)phosphonate.—To a solution of [1-(diethoxyphosphinyl)-2-methylvinyl]-dimethylsulfonium bromide (10.0 g.) in tetrahydrofuran (100 ml.) is added powdered anhydrous potassium hydroxide (1.96 g.). The reaction mixture is stirred for several hours at ambient temperature. The potassium bromide and unreacted hydroxide is removed by filtration and the filtrate is evaporated under vacuum to yield diethyl (cis-1,2-epoxypropyl)phosphonate which is vacuum distilled to afford a purified product boiling at 75–78° C./0.6 mm.

Step F: (Cis - 1,2 - epoxypropyl)phosphonic acid and disodium salt.—Diethyl (cis-1,2-epoxypropyl)phosphonate (1 ml.) in trimethylchlorosilane (10 ml.) is refluxed for eight hours and the reaction mixture is then extracted with water to yield an aqueous solution of (cis-1,2-epoxypropyl)phosphonic acid. The product thus obtained is then treated with two equivalents of sodium hydroxide and the solution evaporated to yield disodium (cis-1,2-epoxypropyl)phosphonate.

EXAMPLE 8

Calcium (−) (cis-1,2-epoxypropyl)phosphonate monohydrate

Step A: (Dichlorophosphinyl)dimethylsulfoxonium methylide.—A solution of 0.1 mole (26.8 g.) of methylene iodide in 100 ml. of dimethylsulfoxide is heated 24 hours at 100° C. in a nitrogen atmosphere. The solution is cooled to 50° C. and treated with 13.6 g. (0.1 mole) of dichloromethoxyphosphine until evolution is then cooled to 20° C. and an equivalent of sodium hydride in oil is added. The mixture is heated slowly to 40° C. whereupon hydrogen evolution ceases. The resulting solution is identified as (dichlorophosphinyl)dimethylsulfoxonium methylide.

Step B: [1 - (dichlorophosphinyl)-2-methylvinyl]-dimethylsulfoxonium bromide.—To the solution of (dichlorophosphinyl)dimethylsulfoxonium methylide obtained in Step A is added 18.8 g. (0.1 mole) of ethylidene dibromide and the mixture treated as in Example 7, Step C. The [1-(dichlorophosphinyl) - 2 - bromopropyl]dimethylsulfoxonium bromide thus obtained is unstable and undergoes spontaneous dehydrohalogenation to afford [1 - (dichlorophosphinyl)-2-methylvinyl]dimethylsulfoxonium bromide.

Step C: Calcium (−) (cis-1,2-epoxypropyl)phosphonate monohydrate.—Upon treating the [1-dichlorophosphinyl) - 2 - methylvinyl]-dimethylsulfoxonium bromide (10.0 g.) obtained in Step B with anhydrous calcium hydroxide according to the conditions described in Example 7, Step E, there is thus obtained calcium (−) (cis-1,2-epoxypropyl)phosphonate monohydrate.

EXAMPLE 9

Diallyl(cis-1,2-epoxypropyl)phosphonate

Step A: Diallyl chloromethylphosphonate.—By substituting allyl alcohol (2.0 mole) for the ethanol reactant of Example 1, Step A, and following the procedure described therein there is obtained diallyl chloromethylphosphonate.

Step B: Diallyloxyphosphinyl)trimethylammonium methylide.—The diallyl chloromethylphosphonate 10.25 g., 0.05 mole) prepared according to Step A is added to 5.0 g. of trimethylamine 9n 100 ml. of dimethylsulfoxide and stirred eight hours at 25° C. Upon removing approximately half of the solvent in vacuo diallyloxyphosphinylmethyl)trimethylammonium chloride precipitates out of solution upon treatment of the precipitate with an equivalent of sodium methylammonium methylide in dimethylsulfoxide for eight hours at 30° C. affords a solution of (diallyloxyphosphinyl)trimethylammonium methylide.

Step C: [1 - (Diallyloxyphosphinyl)-2-methylvinyl]-trimethylammonium bromide.—The solution of (diallyloxyphosphinyl)trimethylammonium methylide obtained according to Step A is treated with an equivalent (9.4 g.) of ethylidene dibromide following the method of Example 1, Step C, there is thus obtained a precipitate of [1 - (diallyloxyphosphinyl)-2-bromopropyl]trimethylammonium bromide which upon treatment with a suspension of potassium tertiary butoxide via the method of Example 1, Step D, affords [1 - (diallyloxyphosphinyl)-2-methylvinyl]trimethylammonium bromide.

Step D: Diallyl-(cis-1,2-epoxypropyl)phosphonate.—Upon treating the (diallylphosphosphinyl)trimethylammonium methylide, with potassium hydroxide according to the method of Example 1, Step E, the compound diallyl (cis-1,2-epoxypropyl)phosphonate is obtained.

Step E: (Cis - 1,2 - epoxypropyl)phosphonic acid.—A solution of diallyl (cis - 1,2 - epoxypropyl)phosphonate (1.91 g., 0.01 mole) in ethanol (20 ml.) is shaken with hydrogen under 40 p.s.i. of pressure at room temperature until the calculated hydrogen uptake for the removal of the two allyl groups in essentially accomplished. The reaction mixture is filtered free of catalyst and the filtrate concentrated under vacuum to yield (cis - 1,2 - epoxypropyl)phosphonic acid.

EXAMPLE 10

Diphenyl (cis-1,2-epoxypropyl)phosphonate

Step A: Diphenyl chloromethylphosphonate.—By substituting phenyl (2.0 moles) for the ethanol reactant of Example 1, Step A, and following the procedure described therein there is obtained diphenyl chloromethylphosphonate.

Step B: (Diphenoxyphosphinyl)triphenylphosphonium methylide.—To a solution of 26 g. of triphenylphosphine in 100 ml. of benzene is added 29 g. (0.1 mole) of diphenyl chloromethylphosphonate. The mixture is refluxed overnight under nitrogen and then cooled to precipitate (diphenoxyphosphinylmethyl)triphenylphosphonium chloride. Upon treatment of the precipitate with sodium methylsulfonylmethylide in dimethyl sulfoxide according to the method described in Example 1, Step B, there is thus obtained (diphenoxyphosphinyl)triphenylphosphonium methylide.

Step C: [1-(diphenoxyphosphinyl)-2-methylvinyl]-triphenylphosphonium bromide.—Treatment of the (diphenoxyphosphinyl)triphenylphosphonium methylide obtained in Step B with (0.09 mole) of ethylidene dibromide via the method of Example 1, Step C, affords [1-(diphenoxyphosphinyl) - 2 - bromopropyl]triphenylphosphonium bromide. Phenyl lithium (6.3 g., 0.075 mole) in ether is then added and, after reflux for two hours, there is then obtained [1-(diphenoxyphosphinyl) - 2 - methylvinyl]triphenylphosphonium bromide. Recrystallization from ethanol and benzene yields pure [1-(diphenoxyphosphinyl) - 2 - methylvinyl]triphenylphosphonium bromide.

Step D: Diphenyl (cis-1,2-epoxypropyl)phosphonate.—Upon treating the [1-(diphenoxyphosphinyl)-2-methylvinyl]triphenylphosphonium bromide obtained according to Step C with solid anhydrous potassium hydroxide via the method of Example 1, Step E, there is thus obtained diphenyl (cis-1,2-epoxypropyl)phosphonate.

EXAMPLE 11

Dibenzyl (cis-1,2-epoxypropyl)phosphonate and mono-triethylammonium salt of (cis - 1,2 - epoxypropyl)phosphonic acid Step A: Dibenzyl iodomethylphosphonate.—Tribenzyl phosphite (0.5 mole) and methylene iodide (0.75 mole)

are heated together in a distillation flask for about two hours or until methyl iodide ceases to distill out. After stripping out excess methylene iodide in vacuo, the residue is subjected to vacuum distillation to afford dibenzyl iodomethylphosphonate.

Step B: (Dibenzyloxyphosphinyl)dimethylsulfoxonium methylide.—Dibenzyl iodomethylphosphonate (10.0 g.) and dimethylsulfoxide (100 ml.) are heated for 24 hours at 150° C. Excess dimethylsulfoxide is removed in vacuo and the mixture is then cooled, filtered, washed and dried to yield crystalline (dibenzyloxyphosphinylmethyl)dimethylsulfoxonium iodide. The (dibenzyloxyphosphinylmethyl)dimethylsulfoxonium iodide (0.23 mole) is then added slowly with stirring to freshly prepared sodium methylsulfonylmethylide, obtained by treating a 60% sodium hydride dispersion in mineral oil (8.8 g., 0.22 mole) with dimethylsulfoxide (250 ml.). There is thus obtained a solution of (dibenzyloxyphosphinyl)dimethylsulfoxonium methylide.

Step C: [1-(dibenzyloxyphosphinyl)-2-methylvinyl]-dimethylsulfoxonium bromide.—The solution of (dibenzyloxyphosphinyl)dimethylsulfoxonium methylide obtained according to Step B is treated with ethylidene dibromide (47 g., 0.2 mole) according to the method described in Example 1, Step C, to afford [1-(dibenzyloxyphosphinyl)-2-bromopropyl]dimethylsulfoxonium bromide. Treatment of [1-(dibenzyloxyphosphinyl)-2-bromopropyl]dimethylsulfoxonium bromide with a solution of potassium tertiary butoxide in dimethylsulfoxide as described in Example 1, Step D, affords [1-(dibenzyloxyphosphinyl)-2-methylvinyl]dimethylsulfoxonium bromide.

Step D: Dibenzyl (cis-1,2-epoxypropyl)phosphonate.—Treatment of the salt obtained in Step C with anhydrous potassium hydroxide according to the method described in Example 1, Step E, affords the product dibenzyl (cis-1,2-epoxypropyl)phosphonate.

Step E: Mono-triethylammonium salt of (cis-1,2-epoxypropyl)phosphonic acid.—To a solution of dibenzyl (cis-1,2-epoxypropyl)phosphonate (0.1 mole) and triethylamine (0.1 mole) in 200 ml. of ethanol is added 10–15 g. of Raney nickel and the mixture is shaken with hydrogen under 40 p.s.i. at room temperature until hydrogen uptake is essentially complete. The reaction mixture is then filtered free of catalyst and the filtrate concentrated to yield mono-triethylammonium (cis-1,2-epoxypropyl)phosphonate.

By substituting the appropriate phosphonic acid derivative for the trimethylphosphite of Example 1, Step C, and following substantially the procedure described in Example 1, Steps C–D, all of the products of this invention may be obtained. The following equation illustrates the reaction of Example 1, Steps C and D and, together with Table I, infra, describe the several varieties of phosphites which may be employed in the process of this invention and the esters and amides of (cis-1,2-epoxypropyl)phosphinic acid which are derived therefrom:

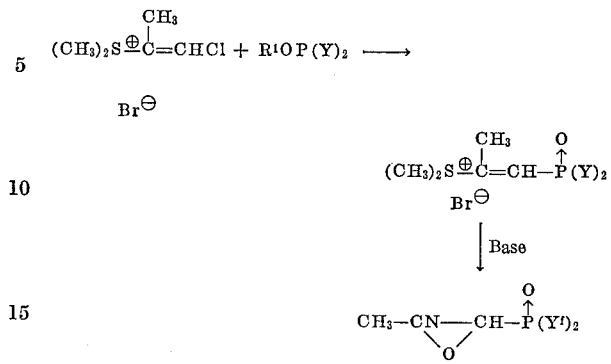

TABLE I

| Ex. | R¹ | Y | Y¹ | Base |
|---|---|---|---|---|
| 12 | —CH(CH₃)₂ | —OCH(CH₃)₂ | —OCH(CH₃)₂ | Anhydrous KOH. |
| 13 | —C(CH₃)₃ | —OC(CH₃)₃ | —OC(CH₃)₂ | Do. |
| 14 | —CH₂C≡CH | —CH₂C≡CH | —OCH₂C≡CH | Do. |
| 15 | —CH₂(CH₂)₃CH₃ | —OCH₂(CH₂)₃CH₃ | —OCH₂(CH₂)₃CH₃ | Do. |
| 16 | —C₆H₅ | —O—C₆H₅ | —O—C₆H₅ | Do. |
| 17 | —CH₂CH₃ | —N(C₂H₅)₂ | —N(C₂H₅)₂ | Do. |
| 18 | —CH₂CH₃ | —N(CH₃)₂ | —N(CH₃)₂ | Do. |

The above examples are merely illustrative of the novel method disclosed and it is to be understood that the invention is not to be limited by the specific illustrative examples but rather embrace all the variations and modifications thereof which fall within the scope of the foregoing discussion and the appended claims.

What is claimed is:

1. A method for the preparation of a compound having the formula:

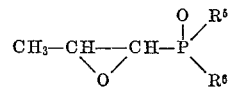

wherein R⁵ and R⁶ represent alkoxy, lower alkenyloxy, lower alkynyloxy, aryloxy, aralkoxy, di-lower alkylamino, hydroxy or a radical or the formula —OM wherein M is the cation derived from the base employed in the reaction; which comprises treating a compound of the formula:

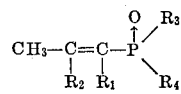

with a base, wherein R¹ and R² represent hydrogen or an onium radical of the formula —R⊕X⊖ wherein R⊕ is a cation selected from di-lower alkylsulfonium, di-lower alkylsulfoxonium, tri-lower alkylammonium or triarylphosphonium and X⊖ is an anion, with the proviso that R¹ and R² cannot both represent hydrogen at the same time, and R³ and R⁴ represent alkoxy, lower alkenyloxy, lower alkynyloxy, aryloxy, aralkoxy, halo or di-lower alkylamino, with the proviso that when R³ and R⁴ represent halo then either or both of R⁵ and R⁶ represent —OH or —OM wherein M is as defined above.

2. The method according to claim 1 wherein the base employed is derived from an alkali metal or an alkaline earth metal.

3. The method according to claim 1 for the preparation of a compound having the formula:

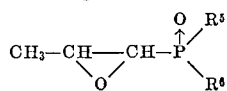

wherein $R^5$ and $R^6$ represent alkoxy, lower alkenyloxy, lower alkynyloxy, aryloxy, aralkoxy, di-lower alkylamino, hydroxy or a radical of the formula —OM wherein M is the cation derived from the base employed in the reaction; which comprises treating a compound of the formula:

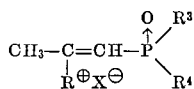

with a base, wherein $R^\oplus$ is a cation selected from di-lower alkylsulfonium, di-lower alkylsulfoxonium, tri-lower alkylammonium or triarylphosphonium and $X^\ominus$ is an anion, with the proviso that $R^1$ and $R^2$ cannot both represent hydrogen at the same time, and $R^3$ and $R^4$ represent alkoxy, lower alkenyloxy, lower alkynyloxy, aryloxy, aralkoxy, halo or di-lower alkylamino, with the proviso that when $R^3$ and $R^4$ represent halo then either or both of $R^5$ and $R^6$ represents —OH or —OM wherein M is as defined above.

4. The method according to claim 1 for the preparation of a compound having the formula:

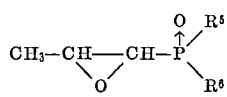

wherein $R^5$ and $R^6$ represent alkoxy, lower alkenyloxy, lower alkynyloxy, aryloxy, aralkoxy, di-lower alkylamino, hydroxy or a radical of the formula —OM wherein M is the cation derived from the base employed in the reaction; which comprises treating a compound of the formula:

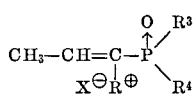

with a base, wherein $R^\oplus$ is a cation selected from di-lower alkylsulfonium, di-lower alkylsulfoxonium, tri-lower alkylammonium or triarylphosphonium and $X^\ominus$ is an anion, with the proviso that $R^1$ and $R^2$ cannot both represent hydrogen at the same time, and $R^3$ and $R^4$ represent alkoxy, lower alkenyloxy, lower alkynyloxy, aryloxy, aralkoxy, halo or di-lower alkylamino, with the proviso that when $R^3$ and $R^4$ represent halo then either or both of $R^5$ and $R^6$ represent —OH or —OM wherein M is as defined above.

5. A method according to claim 1 wherein one of $R^1$ and $R^2$ is hydrogen and the remaining radical is a di-lower alkylsulfonium halide.

6. A method according to claim 1 wherein one of $R^1$ and $R^2$ is hydrogen and the remaining radical is a di-lower alkylsulfoxonium halide.

7. A method according to claim 1 wherein one of $R^1$ and $R^2$ is hydrogen and the remaining radical is a tri-lower alkylammonium halide.

8. A method according to claim 1 wherein one of $R^1$ and $R^2$ is hydrogen and the remaining radical is a tri-arylphosphonium halide.

9. A method according to claim 1 for the preparation of the alkali metal and alkaline earth metal salts of (cis-1,2-epoxypropyl)phosphonic acid; which comprises treating a compound of the formula:

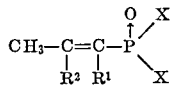

with a base derived from an alkali metal or alkaline earth metal, wherein $R^1$ and $R^2$ represent hydrogen or an onium radical of the formula —$R^\oplus X^\ominus$ where in $R^\oplus$ is a cation selected from di-lower alkylsulfonium, di-lower alkylsulfoxonium, tri-lower alkylammonium or triarylphosphonium and $X^\ominus$ is an anion, with the proviso that $R^1$ and $R^2$ cannot both represent hydrogen at the same time and X is halo.

10. The method according to claim 1 for the preparation of the alkali metal and alkaline earth metal salts of (cis-1,2-epoxypropyl(phosphonic acid; which comprises treating a compound of the formula:

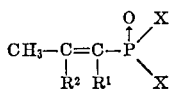

wherein one of $R^1$ and $R^2$ is hydrogen and the remaining radical is a di-lower alkylsulfonium cation or di-lower alkylsulfoxonium cation and X is halo, with a base derived from an alkali metal or alkaline earth metal.

11. The method according to claim 10 wherein the base is sodium hydroxide.

12. The method according to claim 10 for the preparation of calcium (—) (cis-1,2-epoxypropyl)phosphonate monohydrate; which comprises treating [1-(dichlorophosphinyl) - 2 - methylvinyl]dimethylsulfoxonium bromide with anhydrous calcium hydroxide.

References Cited

Bodforss, S., Die Aethylenoxyde, ihre Darstellung und Eigenschaften, 1920 (Sonderausgabe a.d. Sammlung chem. u. chem.-techn. Vortraege. Herausgegeben W. Herz, Breslau, Band XXVI, publ. Verlag von F. Enke), p. 31.

NORMA S. MILESTONE, Primary Examiner

U.S. Cl. X.R.

260—932, 944, 947, 502.4, 567.6 M, 606.5 F, 607 B